US007269520B2

(12) United States Patent
Marti et al.

(10) Patent No.: US 7,269,520 B2
(45) Date of Patent: Sep. 11, 2007

(54) METHOD FOR DETERMINING PRESSURE CAPABILITY IN CONDUIT (75) Inventors: Thomas Marti, Mars, PA (US); David W. Woods, Boulder, CO (US); Steven R. Ferry, Nederland, CO (US)

(73) Assignee: Underground Solutions Technologies Group, Inc., Sarver, PA (US)

( * ) Notice: Subject to any disclaimer, the term of this patent is extended or adjusted under 35 U.S.C. 154(b) by 106 days.

(21) Appl. No.: 11/005,306

(22) Filed: Dec. 6, 2004

(65) Prior Publication Data

US 2005/0126266 A1 Jun. 16, 2005

Related U.S. Application Data

(60) Provisional application No. 60/527,416, filed on Dec. 5, 2003.

(51) Int. Cl.
 *G01L 1/00* (2006.01)
(52) U.S. Cl. .................................... 702/42
(58) Field of Classification Search ............. 702/42, 702/43, 170, 179
 See application file for complete search history.

(56) References Cited

U.S. PATENT DOCUMENTS

2005/0033415 A1* 2/2005 Pelton ...................... 623/1.19

OTHER PUBLICATIONS

American Water Works Association ANSI/AWWA C900-97 (Revision of ANSI/AWWA C900-89) AWWA Standard for Polyvinyl Chloride (PVC) Pressure Pipe and Fabricated Fittings, 4 in. Through 12 in. (100 mm Through 300 mm), For Water Distribution, Feb. 1, 1998.
American Water Works Association ANSI/AWWA C905-97 (Revision of ANSI/AWWA C905-88) AWWA Standard for Polyvinyl Chloride (PVC) Pressure Pipe and Fabricated Fittings, 14, in. Through 48 in. (350 mm Through 1,200 mm), For Water Transmission and Distribution, Feb. 1, 1998.
NSF/ANSI 61-2003e "Drinking water system components -Health effects"; NSF International Standard/American National Standard, Sep. 3, 2003.
"Standard Specification for Poly(Vinyl Chloride) (PVC) Pressure-Rated Pipe (SDR Series)[1]" ASTM Designation: D 2241-00 (pp. 83-91), Sep. 2000.
"Standard Test Method for Apparent Hoop Tensile Strength of Plastic or Reinforced Plastic Pipe by Split Disk Method[1]" ASTM Designation: D 2290-00 (pp. 99-103), Sep. 2000.

(Continued)

*Primary Examiner*—Carol S. W. Tsai
*Assistant Examiner*—Xiuqin Sun
(74) *Attorney, Agent, or Firm*—The Webb Law Firm (57) ABSTRACT

Disclosed is a method that provides for the calculation and prediction of hoop strength of an expanded pipe, preferably a PVC pipe or conduit. The method includes the steps of: (a) determining hoop strength as a function of relative wall thickness; (b) determining Wall Thickness Ratio (WTR) by dividing a nominal wall thickness of the original conduit by the minimum wall thickness of the expanded conduit; (c) determining long-term hydrostatic strength by at least one of hoop testing and burst testing; and (d) applying an accelerated regression analysis to the results in step (c), yielding a Hydrostatic Design Basis (HDB). The resulting HDB may be plotted against WTR to provide the user with graphical data for use in making design decisions and choosing specific conduit for specific applications.

22 Claims, 3 Drawing Sheets

OTHER PUBLICATIONS

"Standard Test Method for Resistance to Short-Time Hydraulic Pressure of Platic Pipe, Tubing, and Fittings[1]" ASTM Designation: D 1599-99 (pp. 28-30), Mar. 2000.

"Standard Specification for Oriented Poly(Vinyl Chloride), PVCO, Pressure Pipe" ASTM Designation: D 14832-98 (pp. 11751179), Mar. 1999.

* cited by examiner

METHOD FOR DETERMINING PRESSURE CAPABILITY IN CONDUIT

CROSS REFERENCE TO RELATED APPLICATIONS

This application takes priority from U.S. Provisional Patent Application No. 60/527,416 filed Dec. 5, 2003, and which is incorporated herein by reference in its entirety.

BACKGROUND OF THE INVENTION

1. Field of the Invention

The present invention relates generally to methods for calculating the physical parameters for conduit for use in a conduit expansion process and, in particular, to a method for determining the pressure capability of such a conduit, including the hydrostatic design basis for expanded conduit, preferably conduit manufactured from polyvinyl chloride (PVC).

2. Description of the Related Art

Open-cut installation of polyvinyl chloride (PVC) conduit for new potable water systems has been a proven methodology for many years. Creating PVC conduit having improved hydrostatic stress rating through expansion and orientation of the polymer (PVCO) is also an established technology. Sliplining (or placing a secondary pipe within a host pipe) in existing pipelines with butt-fused sections of polyethylene (PE) pipe is also a familiar technology.

Pipe made from PVC has been a major success story for the plastics industry for at least three decades. This product is widely used for potable water and wastewater in piping systems ranging in sizes from ½-inch nominal diameter to more than 30 inches diameter. Such piping systems are normally joined with bell-and-spigot gasketed or solvent-cement joints. There are ASTM International (ASTM) Standard Specifications (*Annual Book of ASTM Standards* 2003, *Vol.* 8.04, Plastic Pipe and Building Products, ASTM International, West Conshohocken, Pa. 19428) and American Water Works Association (AWWA) Specifications (*AWWA Standards, American Water Works Association*, Denver, Colo. 80235) that cover these products, including the tests and calculations needed to assign a pressure rating to the finished pipe product.

Unlike polyethylene pipe, which is generally joined by heat fusion techniques, PVC pipe has until now been limited to applications that can be serviced with bell-and-spigot joints. This limitation has restricted use of PVC pipe in sliplining rehabilitation applications. Sliplining is an effective method of pipeline rehabilitation where pipe sections with diameter slightly smaller than the deteriorated existing pipeline are sequentially butt-fused and inserted into the existing pipeline. Lack of formulations and techniques for achieving butt-fused PVC joints with strength approaching that of the PVC material itself has been the primary barrier to using PVC in these applications.

Successful rehabilitation of damaged pipelines requires some means of achieving a close fit between the original pipeline and the liner pipe. This can be achieved by swaging polyethylene pipe to temporarily achieve a slight reduction in diameter, which memory-driven expansion later eliminates. In other applications, an annular space is left between the pipes, and is then filled with grout. In all sliplining applications, reduction of the pipeline capacity by reducing diameter is a major concern and limitation. Inserting PVC pipe, which is inherently stronger than PE pipe at the same thickness, and then expanding the inserted pipe to match its outside diameter to the inside diameter of the original pipeline, minimizes this capacity reduction. Quantifying the strength increase achieved in any given pipe expansion, and capturing this increase in a pressure rating for the rehabilitated pipeline, is beneficial.

Presently, there is no data or methodology to determine the Hydrostatic Design Basis (HDB) of expanded oriented pipe other than at specific predetermined uniform expansion. At zero expansion, the HDB of the PVC conduit is known to be 4000 psi. At two times expansion, the HDB of the PVC conduit is 7100 psi. However, there is a need for a methodology for definitively determining the HDB of expanded PVC conduit at any value between these values. Further, as a result of field conditions, the variance in wall thickness of the PVC starting stock, when expanded, reduces the data confidence level to less than the required 85% when conventional technology is used. Accordingly, there is a need for a methodology that yields results within the required confidence level and fill in the knowledge base between known points.

SUMMARY OF THE INVENTION

It is, therefore, an object of the present invention to provide a method, and in one embodiment, a computer-implementable method, for determining the pressure capability of an expanded conduit. It is another object of the present invention to provide a method for determining the Hydrostatic Design Basis (HDB) of an expanded or expandable conduit. It is a further object of the present invention to provide a method for calculating the hoop strength of an expanded conduit. It is yet another object of the present invention to provide a method for determining the pressure capability of an expanded polyvinyl chloride (PVC) conduit.

The present invention is directed to a method and, in one embodiment to a computer-implemented or computer-implementable method, that provides for the calculation and prediction of hoop strength of an expanded pipe, preferably a PVC pipe or conduit. To allow for field conditions and application, the method of the present invention identifies hoop strength as a function of relative wall thickness. Next, the method determines the Wall Thickness Ratio (WTR) by dividing the nominal wall thickness of the PVC starting stock or conduit by the minimum wall thickness of the conduit, as expanded. This ratio is then used to identify the long term hydrostatic strength as determined through hoop testing, burst testing, and accelerated regression analysis of the results. In one embodiment, results of this analysis, which provides the Hydrostatic Design Basis (HDB) are then plotted against the WTR for the end use product. Development of this method, expanded conduit and system required three technical accomplishments: producing consistent, high-strength fusion joints; expanding the inserted fused sections to the inside diameter of the host pipe; and quantifying the strength increase obtained to rationally assign a pressure rating to the expanded-and-oriented pipe. Data supporting these developments is created utilizing the method of the present invention.

The present invention, both as to its construction and its method of operation, together with the additional objects and advantages thereof, will best be understood from the following description of exemplary embodiments when read in connection with the accompanying drawings.

DETAILED DESCRIPTION OF THE PREFERRED EMBODIMENTS

The present invention is directed to a method of determining pressure capability of a conduit, which is subsequently expanded, yielding an expanded conduit. It is important to determine the pressure capability of the resulting expanded conduit, as that conduit may be subject to an internally pressurized environment, such as use in the high-pressure or municipal water field. This method may be implemented on a computing device, such that the resulting computer-implemented method provides results that are displayable to the user for making appropriate design choices.

In order to effectively utilize PVC pipe in many applications, it must be properly oriented. An ASTM Standard (*ASTM F*1483, *"Standard Specification for Oriented Poly (Vinyl Chloride), PVCO, Pressure Pipe," Annual Book of ASTM Standards* 2003, Vol. 8.04, Plastic Pipe and Building Products, ASTM International, West Conshohocken, Pa. 19428) was published in 1993 describing the materials, requirements, and method of pressure rating PVC, and assigning to that product the material designation PVCO, for oriented PVC. The Standard acknowledges that circumferential expansion of a PVC-based pipe results in orientation of the polymer molecules. This, in turn, increases long-term hoop tensile strength, which in the plastic pipe industry typically is measured by hydrostatic pressure rupture regression testing. Test procedures are given in that Standard for determining a categorized measure of the long-term hydrostatic strength of the PVCO material (called Hydrostatic Design Basis (HDB)). A pressure rating is assigned to the pipe itself based on wall thickness, diameter, and Hydrostatic Design Basis, and service factor.

The Standard further indicates that a relationship exists between the expansion ratio and wall thickness ratio of the expanded pipe, and the long-term hydrostatic strength of the product. Wall thickness ratio refers to the ratio of the starting pipe wall thickness to that of the finished PVCO pipe. The expansion ratio is the ratio of the original to finished (expanded) outside diameters, such that uniform expansion from a diameter of D to a diameter of 2D, with no change in material density, requires a thickness change from T to T/2. The expansion ratio in this case is 0.50, and the wall thickness ratio is 2.0.

Hydrostatic Design Basis (HDB) is the term used in the plastic pipe industry for the categorized long-term hydrostatic strength or stress of a piping material. There are two PVCO materials designated in the ASTM Standard, PVCO 1135 and PVCO 1131, with HDBs of 7100 psi and 6300 psi respectively. The Standard, however, does not indicate what expansion or wall thickness ratios may be associated with these HDBs. A manufacturer must determine these values on an ongoing and often proprietary basis.

Sections of conduit or pipe must be fused when utilized in the expansion and pipeline lining or re-lining process. The process of butt-fusing PE pipe has been practiced for over 30 years. Fusion of PVC pipe with a butt-fuse technique has recently been developed to the point of practical field application. This technique allows for the joining of multiple pipe sections into a continuous gasketless length that can then be expanded inside a deteriorated host pipe, and is embodied in co-pending patent application Ser. No. 10/788,921, filed by Applicant on Feb. 26, 2004.

Two advancements make this possible. First, a specific material formulation, or recipe, was developed that was compatible with high-strength fusion bonds. The plastic pipe industry has previously established generic formula that is acceptable for the production of pressure-rated PVC pipe. This generic formulation is defined in a document designated PPI TR-2. (*PPI TR-*2/2003, *"PPI PVC Range Composition Listing Of Qualified Ingredients,"* Plastics Pipe Institute, 1825 Connecticut Ave NW, Suite 680, Washington, D.C. 20009). In one embodiment, the PVC compound used for Applicant's starting stock complies with the requirements of this generic formulation. However, experience has shown that not all PVC pressure pipe compounds that comply with the generic formulation are suitable for fusing and expanding. Accordingly, specific proprietary formulations meeting all of the requirements of the generic formulation, but more restrictive and specific than the generic formulation, may be desirable. Such a starting stock may meet all of the requirements of AWWA C900/905 (as well as comparable ASTM Specifications). Since this formulation would comply with the generic formulation limits, it would also meets the requirements of NSF Standard 61 (NSF/ANSI 61, *"Drinking Water System Components—Health Effects"*, NSF International, 789 North Dixboro Rd, Ann Arbor, Mich. 48113) for transport of potable water. One such proprietary formulation of PVC is also the subject of co-pending patent application Ser. No. 10/865,504 filed Jun. 10, 2004 by Applicant.

The second advancement was the development of the specific procedural steps for the fusion joint. The procedure involves seven steps: clamping, facing, aligning, heating, joining, holding, and surface finishing. Specific procedures and operational limits for each of these steps needed to be determined, based on mechanical testing of the fusion joint obtained. A combination of conventional tensile testing and high-speed tensile impact testing was performed on both unexpanded and expanded fused joints. Such a PVC fusion process is likewise embodied in and the subject of co-pending patent application Ser. No. 10/788,921, filed Feb. 26, 2004 by Applicant.

This proprietary fusing or joining process utilizes joining equipment readily available in the industry. It is recommended that fusion equipment that has the capability to record data generated from each fusion joint be used. This is to assure that the proper steps have been followed that produce the quality results. Fusion can be done either at surface grade of the site or at the elevation of the host pipe within the access pit. Depth of the host invert and the bending radius of the pipe are factors in determining where best to do the fusion. If the fusion is done within the access pit, it is recommended that fusion equipment with a detachable carriage be used. This allows the power source to be remote from the fusion area producing a better work environment.

The key parameters of heat temperature, joining pressure, hold times and cool down are different than polyethylene pipe. Experience has shown that using a procedure optimized for polyethylene to join PVC pipe will produce poor quality joints. A fusion process specifically designed and verified for a specific PVC formulation must be used in order to obtain acceptable fusion joints. During the fusion process, an inspection of the starting stock is done for any surface scratches or defects that may affect expansion. Because PVC is a harder material than polyethylene, facing blades wear more quickly. Carbide tipped or coated blades have been developed that provide longer life when used with PVC. After fusion, the external bead may be removed with a high-speed rotary tool. This allows for easier pull-in of the joined starting stock.

In-place orientation of the PVC starting stock is accomplished by application of heat and pressure to the material. Prior to this, there are several steps in the process that must be completed. The host pipe is exposed through the excavation of access pits. A small section of line is then removed. With this done, the host is then cleaned to remove any build-up of mineral deposits or corrosion. The cleaning is done to meet the desired inside diameter of the host. The expanded PVC pipe does not adhere to the host. The host acts as a form for the expansion. After cleaning, the host is then video-inspected to verify cleaning and to be sure that there are no sharp protrusions that could affect the PVC material during expansion.

Insertion of the starting stock is the next step. This usually is done in parallel with the fusion process. Insertion is usually done using a constant tension winch. This allows for control of pulling force maintaining a safe value within the capabilities of the cross-section of the pipe. Other precautions include soft guides on the inlet of the host pipe. After insertion, the end expansion hardware is installed and the internal distribution system inserted. The internal distribution system evenly distributes the hot water in the most effective manner for starting stock heating.

The end expansion hardware consisting of an expansion collar, a transition collar, a sizing sleeve and end restraints, are then installed. The expansion and sizing collars allow the starting stock to expand longitudinal and provides a smooth transition from host pipe inside diameter to end outside diameter. The sizing sleeve limits the exposed end expansion to the desired outside diameter for the requested reconnection hardware. The ends can be expanded to a variety of diameters. The most common is to expand the ends to a CIOD or IPS size that is closest to the original host. This allows standard readily available fittings for reconnection of the rehabilitated line to the system. The end restraints are applied externally and internally to hold the end with no movement during processing. This allows end connections with ports and taps for instrumentation and water flow to be installed. After end cap installation, internal and external instrumentation is added for process control. This is done to both ends of the line to be processed. The hardware installed at the terminal ends of the pipe-to-be-expanded is also embodied in and the subject of co-pending patent application Ser. No. 10/865,738, filed Jun. 10, 2004 by Applicant.

In one embodiment, expansion may be accomplished using a specially designed and constructed Mobile Expansion Vehicle. This is a self-contained, self-sufficient vehicle that contains all necessary equipment to properly expand the starting stock. An initial pressure test is done to ensure system integrity and initiate circulation of the water in the system. Then, the heating unit is engaged and water in the system is brought slowly to processing temperature. Upon reaching processing temperature, a second pump is used to provide added pressure for expansion as well as to provide volume increase while at this temperature and pressure. Expansion is monitored throughout the duration of processing. Completion of expansion is determined by measuring the needed volume to achieve expansion and pressure increase indicating contact with the host pipe. After completion of expansion, cool down is initiated by introducing cool water to the circulation loop while under pressure. With processing complete, the hardware is removed and the ends trimmed to length for reconnection. The expansion process equipment, process and mobile expansion unit are all embodied in and the subject of co-pending patent application Ser. No. 10/865,503, filed by Applicant on Jun. 10, 2004.

With respect to the present invention, conventional PVCO pipe, expanded in the controlled conditions of a manufacturing plant, can be uniformly expanded to tightly control outside diameter and wall thickness. This uniformity allows the pipe to be pressure-rated based on a limited number (two at present) of HDBs, based on consistent and predictable outside diameter and minimum wall thickness. No field-based expansion within an existing deteriorated pipeline will be quite so predictable: there will be variability in the outside diameter obtained, due to variability in the inside diameter of the original pipe; and the thickness of the expanded-in-place pipe may be less uniform, because the field expansion process introduces new variables.

It is possible to deal with this variation and still take advantage of the hoop tensile strength increase obtained by expansion. Expansion ratio, based on average outside diameters, does not capture the variation in wall thickness that can occur when a pipe is expanded. A non-uniformly expanded length of pipe will have one expansion ratio, but many different wall thickness ratios.

Measuring the hoop tensile strength of a piping material by hydrostatic stress-rupture testing of pipe is an established and effective technique. (*ASTM D1599, "Standard Test Method for Resistance to Short-Time Hydraulic Pressure of Plastic Pipe, Tubing, and Fittings," Annual Book of ASTM Standards* 2003, *Vol.* 8.04, Plastic Pipe and Building Products, ASTM International, West Conshohocken, Pa. 19428). It is, however, a cumbersome and costly way of determining the relationship between hoop tensile strength and degree of expansion, and especially so if the expansion was not highly uniform. A pipe sample several feet in length, which is internally pressurized to failure (burst test), will fail at its weakest point, providing strength information only for that point. With non-expanded, non-oriented pipe, the weakest point will be along a longitudinal line of minimum thickness. This same assertion cannot be made for expanded, oriented pipe without prior knowledge of the relationship between hoop tensile strength and thickness ratio. Hydrostatic bursting of a PVC pipe in the lab is a rather violent and destructive event, making it impossible to determine the thickness of the failure point after the fact.

The alternate means of determining hoop tensile strength of a pipe is a split-disk tensile test. (*ASTM D2290, "Standard Test Method for Apparent Hoop Tensile Strength of Plastic or Reinforced Plastic Pipe by Split Disk Method," Annual Book of ASTM Standards* 2003, *Vol.* 8.04, Plastic Pipe and Building Products, ASTM International, West Conshohocken, Pa. 19428). This has several advantages. A test can be performed on about 2 linear inches of pipe, and the failure location can be pre-selected around the circumference. The pre-selected failure area can be carefully measured, so the wall thickness ratio associated with the hoop tensile strength measured can be precisely determined. A single expanded pipe length can be sampled to provide specimens covering a range of wall thickness ratios.

Figure 1:
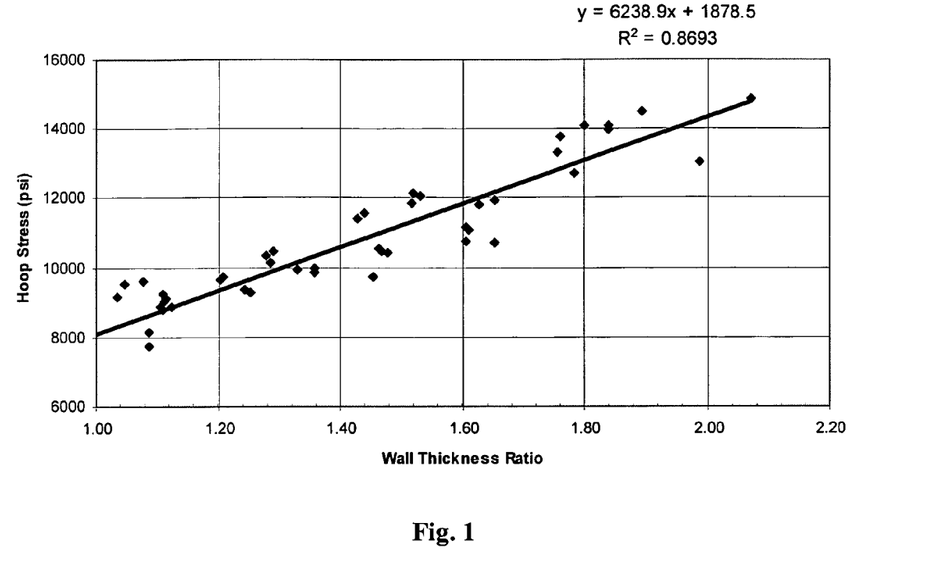
FIG. 1 is a chart of hoop stress versus wall thickness ratio a plotted in an intermediate step of the method according to the present invention.

Hoop tensile testing, including pipes with three diameters and two expansion ratios, with wall thickness ratios ranging from 1.11 to 2.07, results in a specified set of data. FIG. 1 illustrates the data; the relationship between wall thickness ratio and strength is clearly apparent. In particular, FIG. 1 illustrates the hoop strength of the sample versus wall thickness ration (WTR). These results show that the short-term hoop tensile strength is strongly correlated with wall thickness ratio. Knowing the slope of the strength vs. wall thickness ratio line gives us the information we need to confirm that hydrostatic bursting of a pipe section will, even in a non-uniformly expanded pipe, occur at the location coincident with the minimum wall thickness, as the following calculation illustrates. The relationship between the pressure in a pipe and the hoop tensile stress in the pipe wall is commonly called the ISO equation (*ASTM D2241, "Standard Specification for Poly (Vinyl Chloride) (PVC) Pressure-Rated Pipe (SDR Series)*, 3.2.3, *Annual Book of ASTM Standards* 2003, *Vol.* 8.04, Plastic Pipe and Building Products, ASTM International, West Conshohocken, Pa. 19428):

$$2S/P=(D_0/t)-1$$

Where:

| | | |
|---|---|---|
| S | = | hoop tensile stress |
| P | = | pipe internal pressure |
| $D_0$ | = | average outside diameter |
| t | = | wall thickness |

Rearranging the equation to give pressure as a function of the other variables gives:

$$P=2St/(D_0-t)$$

For a pipe burst test, P is the burst pressure and S is the hoop tensile strength. For oriented pipe, we can express S as a function of wall thickness ratio, giving:

$$P=(2(1879+6239 \cdot WTR)t)/(D_0-t).$$

Figure 2:
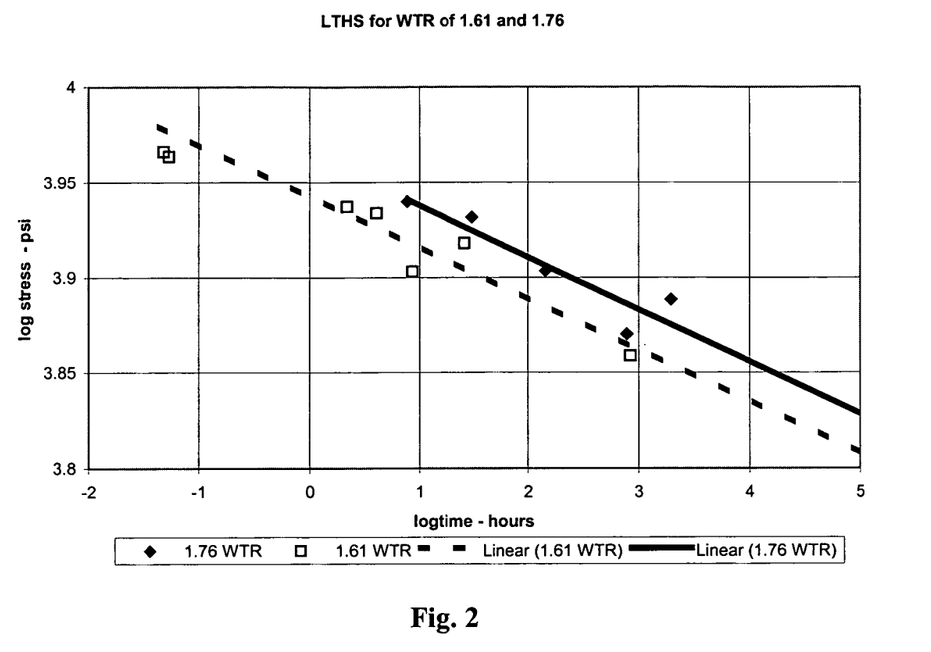
FIG. 2 is a chart of long-term hydrostatic strength over time for specific wall thickness ratios in an intermediate step of the method according to the present invention.

The above equation allows the calculation of the short-term failure (or burst) pressure for an expanded and oriented pipe, knowing only the final outside diameter, the starting thickness, and the minimum final thickness. It does not, however, allow us to calculate the long-term failure pressure; for that, a long-term failure stress is required, together with HDB. For oriented pipe, HDB is required as a function of wall thickness ratio. Having confirmed that the failure even in oriented pipe will occur at the minimum wall thickness, groups of specimens are selected that have approximately the same unexpanded dimensions, expanded outside diameter, and minimum thickness (and therefore approximately the same wall thickness ratio). Testing these specimens in accordance with the accepted Accelerated Regression Test (*ASTM F*1483, *op cit,* 7.5.) gives an HDB for that wall thickness ratio. FIG. 2 illustrates the results of two such determinations as a plot of long-term hydrostatic strength over time for specific wall thickness ratios.

Starting again with the formula:

$$P=2St/(D_0-t)$$

In a long-term tensile stress calculation, the hoop tensile stress (S) is expressed as follows:

$$S=HDB/F$$

Where:

| | | |
|---|---|---|
| HDB | = | hydrostatic design pressure |
| F | = | safety factor (known and variable according to material) |

Therefore, the pressure equation is translated to:

$$P=(2(HDB/F)t)/(D_0-t)$$

Finally, with: HDB=(3147.5·WTR+1069.5), the long-term hydrostatic stress (as a function of wall thickness) is:

$$P=(2((3147.5 \cdot WTR+1069.5)/F)t)/(D_0-t)$$

Figure 3:
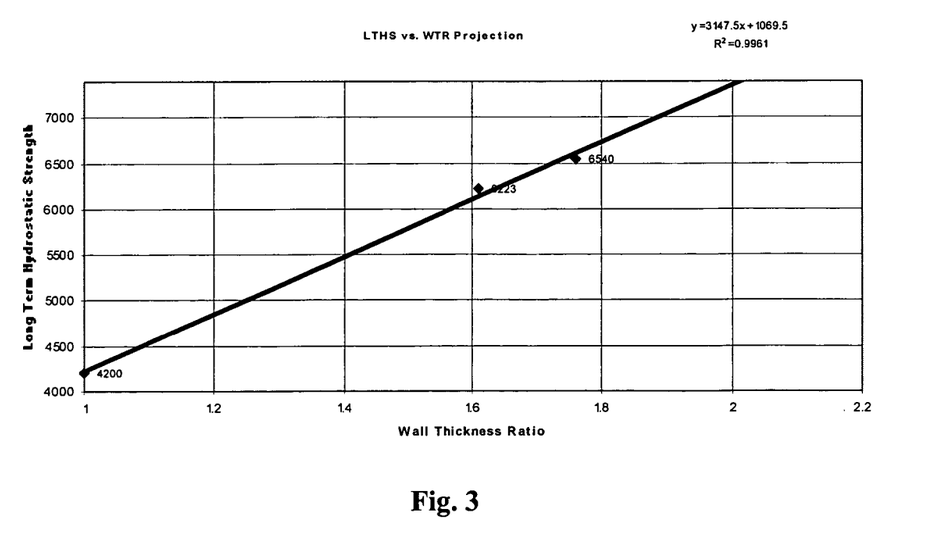
FIG. 3 is a chart of projected long-term hydrostatic strength versus wall thickness ratio in a step in one embodiment of the method according to the present invention.

This test is repeated using specimen sets with different wall thickness ratios, which are used to plot HDB as a function of wall thickness ratio for a specific PVC formulation and expansion process. FIG. 3 illustrates long-term hydrostatic stress versus wall thickness ratio as an output projection based on the data currently available. Therefore, the presently-invented method provides hydrostatic design basis and/or long-term hydrostatic stress as a function of wall thickness ratio. The user may then make design decisions based upon this information.

The method of the present invention is useful in many applications. Current applications are being implemented in municipal water distribution and transmission systems. Fire loops are another prominent application. Beyond the water pressure areas, another application is the rehabilitation of sewerage force mains. Industrial uses such as the rehabilitation of cooling tower lines, brine line, etc. are also actively being developed. Because of the structural nature of the finished product, current projects include gravity sewers where enhancement of the structural qualities of the conduit are desired.

The method of the present invention is useful with expanded conduit manufactured from a thermoplastic material, and is particularly useful with expanded conduit manufactured from polyvinyl chloride (PVC). The original conduit may be uniformly, non-uniformly or partially uniformly expanded.

Figure 4:
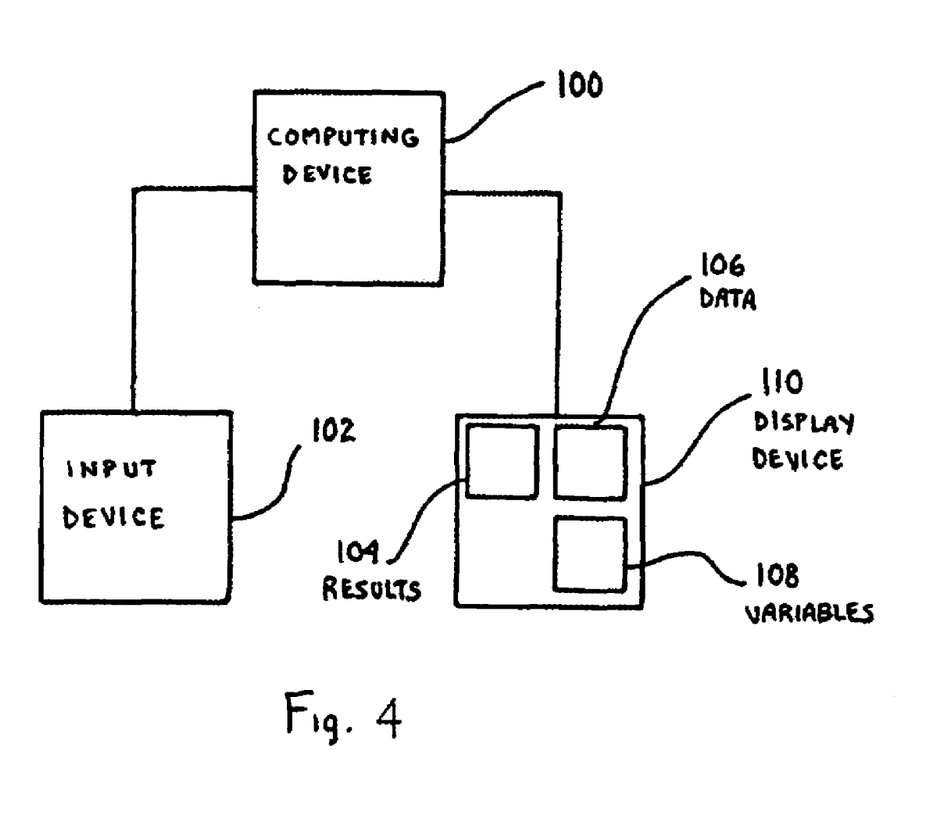
FIG. 4 is a schematic view of an apparatus for implementing a method of determining pressure capability in conduit according to the present invention.

The results of the regression analysis may be offered in a graphical form, such as in the above-discussed plot of HDB against WTR. Further, and as illustrated in FIG. 4. the means for completing or implementing this method may be a computing device 100, such as a computer, a personal computer, a laptop, a palmtop, a personal digital assistant, a server and a networked computer. The variables underlying the present method, such as the hoop strength, the relative wall thickness, the wall thickness ratio, the nominal wall thickness of the original conduit, the minimum wall thickness of the expanded conduit, pipe internal pressure, average outside diameter, wall thickness, hoop tensile strength and the long-term hydrostatic strength, may be provided to a computing device 100 by a user utilizing an input device 102, such as a keyboard, a mouse, a trackball and a device in communication with the computing device 100.

The results 104, data 106 and variables 108, such as the hoop strength, the relative wall thickness, the wall thickness ratio, the nominal wall thickness of the original conduit, the minimum wall thickness of the expanded conduit, pipe internal pressure, average outside diameter, wall thickness, hoop tensile strength, the long-term hydrostatic strength, the hydrostatic design basis, projected data, projected results and projected variables, may be visually provided on a display device 110 in communication with the computing device 100. In addition, the results 104 of the regression analysis, the wall thickness ratio, the hydrostatic design basis, the long-term hydrostatic strength, pipe internal pressure, hoop tensile strength, projected long-term hydrostatic stress, projected wall thickness ratio, pipe internal pressure, average outside diameter, wall thickness, hoop tensile strength, projected data projected results 104 projected variables 108 and combinations may be plotted and presented in graphical form on the display device 100.

Using the results and the plots, the user may make informed choices about which conduit should be used in certain situations and under certain physical conditions. Accordingly, the user may use the method to choose a specifically-dimensioned conduit for a specified application based upon the hoop strength, the relative wall thickness, the wall thickness ratio, the nominal wall thickness of the original conduit, the minimum wall thickness of the expanded conduit, pipe internal pressure, average outside diameter, wall thickness, hoop tensile strength, the long-term hydrostatic strength, the hydrostatic design basis, projected data, projected results and/or projected variables. In one embodiment, this design choice is made based upon the projected hydrostatic design basis and/or the long-term hydrostatic stress as a function of wall thickness ratio. In one embodiment, the long-term hydrostatic stress is determined by at least one of hoop testing and burst testing. Still further, the projected hydrostatic design basis is in the range of about 4000 and about 7100 psi.

The method of the present invention allows for the determination of strength over a range of expansions. The expansion is defined in a WTR (wall thickness ratio). The variation in WTR is accommodated in the methodology. This allows the best suited starting stock size to be used improving the efficiency of the technology.

This invention has been described with reference to the preferred embodiments. Obvious modifications and alterations will occur to others upon reading and understanding the preceding detailed description. It is intended that the invention be construed as including all such modifications and alterations.

The invention claimed is:

1. A method for determining a pressure capability of an expanded conduit after an expansion process, whereby an original conduit is expanded, resulting in an expanded conduit, the method comprising the steps of:
   (a) determining hoop strength as a function of relative wall thickness;
   (b) determining Wall Thickness Ratio (WTR) by dividing a nominal wall thickness of the original conduit by the minimum wall thickness of the expanded conduit;
   (c) determining long-term hydrostatic stress;
   (d) applying an accelerated regression analysis to the results in step (c), yielding a Hydrostatic Design Basis (HDB); and
   (e) storing, outputting, displaying or otherwise presenting the Hydrostatic Design Basis (HDB) determined in step (d).

2. The method of claim 1, wherein the expanded conduit is manufactured from a thermoplastic material.

3. The method of claim 2, wherein the thermoplastic material is polyvinyl chloride.

4. The method of claim 1, wherein the original conduit is at least one of uniformly, non-uniformly and partially uniformly expanded.

5. The method of claim 1, further comprising the step of determining pipe internal pressure in the formula: $P=2St/(D_0-t)$, wherein:
   S = hoop tensile strength;
   $D_0$ = average outside diameter; and
   t = wall thickness.

6. The method of claim 1, wherein the expanded conduit is oriented, the method further comprising the step of determining short-term (burst) pipe internal pressure (P) in the formula: $P=(2(1879+6239\times WTR)t)/(D_0-t)$, wherein:
   $D_0$ = average outside diameter; and
   t = wall thickness.

7. The method of claim 1, wherein the expanded conduit is oriented, the method further comprising the step of determining long-term hydrostatic pipe internal pressure (P) in the formula: $P=(2((3147.5 \cdot WTR+1069.5)/F)t)/(D_0-t)$, wherein:
   F = safety factor;
   $D_0$ = average outside diameter; and
   t = wall thickness.

8. The method of claim 1, further comprising the step of determining short-term internal pipe pressure for at least one of the expanded conduit and an oriented expanded conduit based upon at least one of final outside diameter, starting thickness, minimum final thickness, hoop tensile strength, average outside diameter, wall thickness, pipe internal pressure and wall thickness ratio.

9. The method of claim 1, further comprising the step of determining long-term internal pipe pressure for at least one of the expanded conduit and an oriented expanded conduit based upon at least one of final outside diameter, starting thickness, minimum final thickness, hoop tensile strength, average outside diameter, wall thickness, pipe internal pressure, a safety factor and wall thickness ratio.

10. The method of claim 1, further comprising the step of plotting at least one of HDB against WTR, short-term (burst) pipe internal pressure and long-term pipe internal pressure.

11. The method of claim 10, further comprising the step of displaying the resulting plot is a user on a display device.

12. The method of claim 1, wherein at least one step of the method is completed by a computing device.

13. The method of claim 12, wherein the computing device is at least one of a computer, a personal computer, a laptop, a palmtop, a personal digital assistant, a server and a networked computer.

14. The method of claim 1, wherein at least one of the hoop strength, the relative wall thickness, the wall thickness ratio, the nominal wall thickness of the original conduit, the minimum wall thickness of the expanded conduit, pipe internal pressure, average outside diameter, wall thickness, hoop tensile strength, a safety factor, short-term (burst) pipe internal pressure and the long-term hydrostatic strength is provided to a computing device by a user utilizing an input device.

15. The method of claim 14, wherein the input device is at least one of a keyboard, a mouse, a trackball and a device in communication with the computing device.

16. The method of claim 1, wherein at least one of the hoop strength, the relative wall thickness, the wall thickness ratio, the nominal wall thickness of the original conduit, the minimum wall thickness of the expanded conduit, pipe internal pressure, average outside diameter, wall thickness, hoop tensile strength, the long-term hydrostatic strength, the hydrostatic design basis, short-term pipe internal pressure, long-term pipe internal pressure, projected data, projected results and projected variables is visually provided on a display device in communication with a computing device.

17. The method of claim 16, wherein at least one of the results of the regression analysis, the wall thickness ratio, the hydrostatic design basis, the long-term hydrostatic strength, pipe internal pressure, short-term pipe internal pressure, hoop tensile strength, projected long-term hydrostatic stress, projected wall thickness ratio, pipe internal pressure, average outside diameter, wall thickness, hoop tensile strength, projected data, projected results, projected variables, and combinations thereof are plotted and presented in graphical form.

18. The method of claim 1, further comprising the step of choosing a specifically-dimensioned conduit for a specified application based upon at least one of the hoop strength, the relative wall thickness, the wall thickness ratio, the nominal wall thickness of the original conduit, the minimum wall thickness of the expanded conduit, pipe internal pressure, average outside diameter, wall thickness, hoop tensile strength, the long-term hydrostatic strength, the hydrostatic design basis, short-term (burst) pipe internal pressure, long-term pipe internal pressure, projected data, projected results and projected variables.

19. The method of claim 1, further comprising the step of choosing a specifically dimensioned conduit for a specified application based upon at least one of projected hydrostatic design basis and the long-term hydrostatic stress as a function of wall thickness ratio.

20. The method of claim 1, wherein the long-term hydrostatic stress is determined by at least one of hoop testing and burst testing.

21. The method of claim 1, wherein projected hydrostatic design basis is in the range of about 4000 and about 7100 psi.

22. A system for determining a pressure capability of an expanded conduit after an expansion process, whereby an original conduit is expanded, resulting in an expanded conduit, comprising:
- means for determining hoop strength as a function of relative wall thickness;
- means for determining Wall Thickness Ratio (WTR) by dividing a nominal wall thickness of the original conduit by the minimum wall thickness of the expanded conduit;
- means for determining long-term hydrostatic stress;
- means for determining a Hydrostatic Design Basis (HDB); and means for storing, outputting, displaying or otherwise presenting the determined Hydrostatic Design Basis (HDB).

* * * * *

UNITED STATES PATENT AND TRADEMARK OFFICE
CERTIFICATE OF CORRECTION

PATENT NO. : 7,269,520 B2 Page 1 of 1
APPLICATION NO. : 11/005306
DATED : September 11, 2007
INVENTOR(S) : Thomas Marti et al.

It is certified that error appears in the above-identified patent and that said Letters Patent is hereby corrected as shown below:

<u>Title Page of the Patent</u>, See Item (56) References Cited, OTHER PUBLICATIONS, Page 2, Line 2, "Pressure of Platic Pipe" should read -- Pressure of Plastic Pipe --

<u>Column 9</u>, Line 11, after "projected data", insert -- 106, --

<u>Column 10</u>, Line 5, Claim 5, after "internal pressure", insert -- (P) --

<u>Column 10</u>, Line 67, Claim 16, after "short-term", insert -- (burst) --

<u>Column 11</u>, Line 7, Claim 17, after "short-term", insert -- (burst) --

Signed and Sealed this

First Day of April, 2008

JON W. DUDAS
*Director of the United States Patent and Trademark Office*